(12) United States Patent
Bosetti et al.

(10) Patent No.: US 10,429,511 B2
(45) Date of Patent: Oct. 1, 2019

(54) LIGHT DETECTION AND RANGING (LIDAR) ICE DETECTION SYSTEM

(71) Applicant: The Boeing Company, Chicago, IL (US)

(72) Inventors: Cris K. Bosetti, Seattle, WA (US); John J. Biel-Goebel, Bethesda, MD (US); Michael C. Cates, Albuquerque, NM (US); W. Brendan Blanton, Ridley Park, PA (US); Bernard P. Paul, Jr., Lynnwood, WA (US); Ken L. Bernier, O'Fallon, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/669,166

(22) Filed: Aug. 4, 2017

(65) Prior Publication Data
US 2018/0321386 A1 Nov. 8, 2018

Related U.S. Application Data

(60) Provisional application No. 62/501,246, filed on May 4, 2017.

(51) Int. Cl.
*G01S 17/95* (2006.01)
*G01S 17/42* (2006.01)
(Continued)

(52) U.S. Cl.
CPC .............. *G01S 17/95* (2013.01); *B64D 15/20* (2013.01); *G01S 7/4802* (2013.01);
(Continued)

(58) Field of Classification Search
CPC ........ G01S 17/95; G01S 17/499; G01S 17/87; G01S 17/42; G01S 17/4802; G08B 19/02; B64D 15/20
See application file for complete search history.

(56) References Cited

U.S. PATENT DOCUMENTS

| 5,523,959 | A | * | 6/1996 | Seegmiller | ............. | B64D 15/20 |
| | | | | | | 244/134 F |
| 5,589,822 | A | * | 12/1996 | Stern | ...................... | B64D 15/20 |
| | | | | | | 340/583 |

(Continued)

FOREIGN PATENT DOCUMENTS

| CN | 101792021 | 8/2010 |
| DE | 102011102804 | 12/2012 |

(Continued)

OTHER PUBLICATIONS

Extended European Search Report dated Feb. 2, 2018 for EP application No. 17184132.3.

(Continued)

*Primary Examiner* — Adnan Aziz
(74) *Attorney, Agent, or Firm* — Gates & Cooper LLP

(57) ABSTRACT

A Light Detecting and Ranging (LIDAR) based system detecting and quantifying ice accretions and shedding on an aircraft. This system can be used to detect ice, operate ice protection systems, and satisfy aircraft icing certification requirements. This system can also be used to determine the shape, thickness, type, and location of the ice accretions.

20 Claims, 12 Drawing Sheets

(51) Int. Cl.
  *G01S 17/87* (2006.01)
  *G01S 7/48* (2006.01)
  *G01S 7/499* (2006.01)
  *B64D 15/20* (2006.01)
  *G05B 19/02* (2006.01)
  *G08B 19/02* (2006.01)
  *G01S 17/88* (2006.01)
  *G01S 17/89* (2006.01)

(52) U.S. Cl.
  CPC ............ *G01S 7/4808* (2013.01); *G01S 7/499* (2013.01); *G01S 17/42* (2013.01); *G01S 17/87* (2013.01); *G01S 17/88* (2013.01); *G01S 17/89* (2013.01); *G08B 19/02* (2013.01)

(56) References Cited

U.S. PATENT DOCUMENTS

| | | | |
|---|---|---|---|
| 5,617,076 A | 4/1997 | Stern | |
| 5,760,711 A * | 6/1998 | Burns | B64D 15/20 340/583 |
| 5,838,239 A * | 11/1998 | Stern | B64D 15/20 340/583 |
| 5,921,501 A | 7/1999 | Pernick | |
| 6,010,095 A | 1/2000 | Hackmeister | |
| 6,207,940 B1 | 3/2001 | Feher et al. | |
| 6,286,370 B1 | 9/2001 | Sinha | |
| 6,371,411 B1 | 4/2002 | Breer et al. | |
| 6,457,676 B1 | 10/2002 | Breer et al. | |
| 6,642,490 B2 | 11/2003 | Feher | |
| 6,688,558 B2 | 2/2004 | Breer et al. | |
| 6,819,265 B2 * | 11/2004 | Jamieson | B64D 15/20 340/962 |
| 7,370,525 B1 * | 5/2008 | Zhao | B64D 15/20 73/170.17 |
| 7,439,877 B1 | 10/2008 | Jarvinen | |
| 7,933,002 B2 * | 4/2011 | Halldorsson | G01P 5/26 356/28 |
| 8,144,325 B2 * | 3/2012 | Ray | B64D 15/20 356/342 |
| 8,325,338 B1 | 12/2012 | Pope et al. | |
| 8,462,354 B2 * | 6/2013 | Barnes | B64D 15/20 356/445 |
| 8,517,601 B2 | 8/2013 | Stothers et al. | |
| 9,242,735 B1 | 1/2016 | Meis et al. | |
| 9,429,680 B2 | 8/2016 | Grzych et al. | |
| 9,469,408 B1 | 10/2016 | Elangovan et al. | |
| 9,546,004 B1 | 1/2017 | Safai et al. | |
| 9,676,485 B2 | 6/2017 | Stothers et al. | |
| 9,696,238 B2 | 7/2017 | Bosetti et al. | |
| 9,776,731 B1 * | 10/2017 | Lieberman | B64D 45/00 |
| 2004/0036630 A1 | 2/2004 | Jamieson et al. | |
| 2005/0087720 A1 | 4/2005 | Samuels et al. | |
| 2005/0263646 A1 * | 12/2005 | Nichols | B64D 15/20 244/134 F |
| 2010/0328644 A1 | 12/2010 | Lu et al. | |
| 2012/0085868 A1 * | 4/2012 | Barnes | B64D 15/20 244/134 F |
| 2012/0274938 A1 * | 11/2012 | Ray | B64D 15/20 356/342 |
| 2013/0113926 A1 * | 5/2013 | Chen | B64D 15/20 348/135 |
| 2013/0320145 A1 | 12/2013 | McGillis et al. | |
| 2014/0055611 A1 | 2/2014 | Wong et al. | |
| 2014/0117106 A1 | 5/2014 | Acheson et al. | |
| 2015/0108233 A1 | 4/2015 | Wright | |
| 2015/0260099 A1 | 9/2015 | Gally et al. | |
| 2016/0311542 A1 | 10/2016 | Mackin | |
| 2016/0356180 A1 | 12/2016 | Bol | |
| 2017/0008635 A1 | 1/2017 | Mackin et al. | |
| 2017/0057618 A1 | 3/2017 | Khozikov et al. | |
| 2017/0057644 A1 | 3/2017 | Khozikov et al. | |
| 2017/0158336 A1 | 6/2017 | Meis et al. | |
| 2017/0166314 A1 | 6/2017 | Meis et al. | |
| 2017/0166777 A1 | 6/2017 | Berry et al. | |
| 2017/0190431 A1 | 7/2017 | Dichek et al. | |
| 2017/0204291 A1 | 7/2017 | Berry et al. | |
| 2017/0210478 A1 | 7/2017 | Mackin | |
| 2017/0233106 A1 | 8/2017 | Svanebjerg et al. | |
| 2017/0283078 A1 * | 10/2017 | Loussides | G01S 17/89 |
| 2017/0313428 A1 | 11/2017 | Mackin et al. | |
| 2018/0079511 A1 | 3/2018 | Mackin | |
| 2018/0079512 A1 | 3/2018 | Jackowski et al. | |

FOREIGN PATENT DOCUMENTS

| | | |
|---|---|---|
| GB | 2130158 | 5/1984 |
| GB | 2130158 A | 5/1984 |
| WO | 99/16034 | 4/1999 |
| WO | 9916034 A1 | 4/1999 |

OTHER PUBLICATIONS

U.S. Appl. No. 15/639,917, Non Final Office Action dated Jul. 11, 2018.
U.S. Appl. No. 15/639,975, Non Final Office Action dated Jun. 14, 2018.
U.S. Appl. No. 15/639,975, Non Final Office Action dated Dec. 21, 2017.
European Application Serial No. 17184132, European Search Report dated Feb. 2, 2018.
Extended European Search Report dated Oct. 8, 2018 for European Patent Application No. 18165464.1.

* cited by examiner

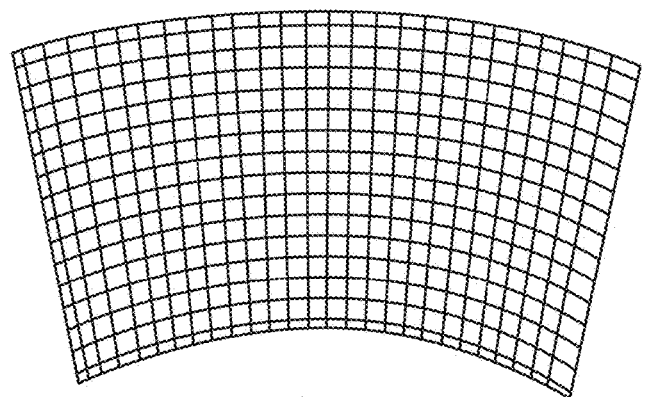
FIG. 4A
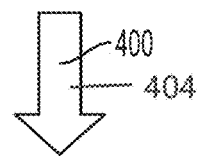
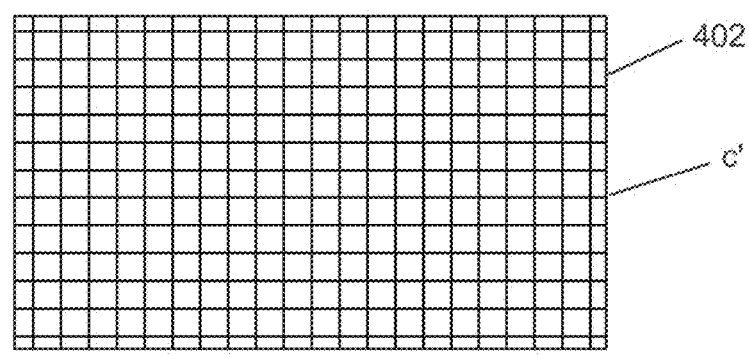
FIG. 4B

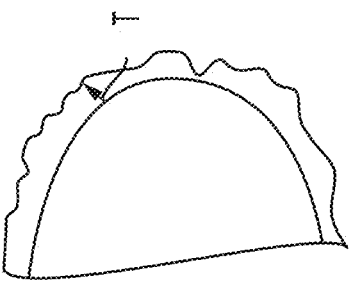
FIG. 7B
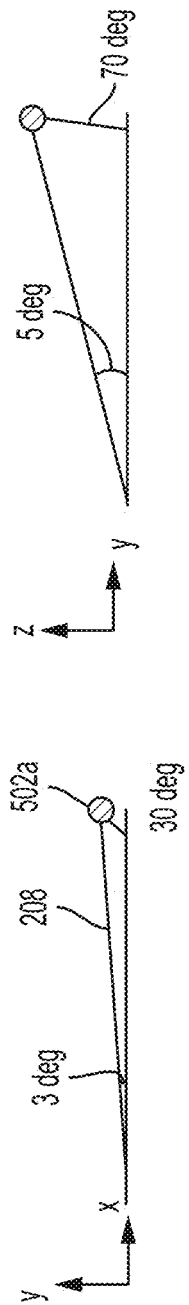
FIG. 7A
FIG. 8C
FIG. 8B
FIG. 8A

LIGHT DETECTION AND RANGING (LIDAR) ICE DETECTION SYSTEM

CROSS REFERENCE TO RELATED APPLICATIONS

This application claims the benefit under 35 U.S.C. Section 119(e) of commonly-assigned U.S. Provisional Patent Application No. 62/501,246, filed May 4, 2017, by Cris Bosetti, John J. Biel-Goebel, Michael C. Cates, William Brendan Blanton, Bernard P. Paul, and Ken L. Bernier, entitled "LIGHT DETECTION AND RANGING (LIDAR) ICE DETECTION SYSTEM," which application is incorporated by reference herein.

BACKGROUND

1. Field

The present disclosure relates to a system for detecting ice using LIDAR.

2. Description of the Related Art

Ice buildup on aerodynamic surfaces of aircraft can be problematic. For example, ice can build up on wings, the empennage, engine nacelles, and rotors on rotorcraft. The ice can disrupt the intended airflow over the aerodynamic surfaces, causing a loss of lift generated by the aerodynamic surface.

There is always some risk of a dangerous accumulation of ice prior to takeoff in wintry conditions. Moreover, icing can be encountered during the many different phases of flight (including during takeoff, takeoff roll, climb out, decent, approach, and landing). One of the primary considerations for certification and system design is the 45 minute hold case, involving holding the aircraft in a racetrack pattern at destination. This can result in one of the largest ice accretions that must be considered. More rare cases include icing at cruise altitudes (usually in the tropical regions) that are outside the certification envelope limit. In addition, very heavy icing environments can be encountered during various Extended-range Twin-engine Operational Performance Standards (ETOPS) scenarios where cruise altitudes must drop and icing conditions cannot be avoided. All this ice must be considered for go around, landing climb, general handling qualities, and buffet.

Icing accretion sensing is currently achieved using ultrasound, magnetorestrictive, or two sensor systems probe-style ice detectors mounted on the fuselage. FIG. 1 illustrates an in-flight ice accretion detector including flush-mounted surface ice detectors and probe-style ice condition detectors 100, similar to Total Air Temperature (TAT) probes, mounted on the fuselage 100, wing 102, or engine inlet of aircraft 104. The ice condition probes detect moisture and, combined with temperature data, predict icing conditions and transmit the detected data to a Line Replacement Unit (LRU). The LRU compares the data against minimums and informs the cockpit computers 106 and pilots of the current icing conditions. In response to the detection of ice by the ice detectors, the bleed air or resistive heating ice protection is activated and the stall protection boundaries are set to conservative angle of attack limits.

However, ice protection/detection systems are not typically used on rotorcraft because of the difficulty of their implementation without impeding the motion of the rotors. Consequently, rotorcraft typically have severely restricted icing flight envelopes (e.g., restriction to flights in temperatures of no lower than −5 degrees Celsius and in light icing conditions) so as to avoid regions where excessive rotor icing can lead to rapid torque rises, asymmetric ice shedding with associated increased vibration, and shed ice damage.

Moreover, conventional ice detection/protection systems have limitations and drawbacks which lead to a number of problems on which the systems are installed. Probes in the airstream have characteristics which are different than the characteristics than the critical surfaces of merit on an aircraft, which may result in ice accretion on the wing when the probe does not sense ice. Other ice accretion sensors which are embedded in the critical surface can only detect ice at the location they are installed. Thus, current ice condition detection systems can only conservatively detect when the aircraft is in icing conditions (not whether there is actual ice accretion present on the critical surface) and cannot detect whether ice has been shed and is no longer present.

As a result, on aircraft where icing is encountered and detected by an in-flight ice accretion detector, stall protection is typically set to conservative values for the duration of the flight (even when ice protection has been functioning properly and turned off after an appropriate delay after exiting icing conditions). This is because conventional ice detectors are designed to confirm ice accretion is occurring, but do not confirm that the aircraft leading edge is clear of ice. While the need to detect the presence or sublimation of ice over the aircraft leading edge points to the use of special ultrasonic guided wave sensors, these sensors are expensive to install and have increased points of failure. Thus, the crew are typically unable to confirm the absence of ice and are obliged to continue the entire flight with the conservative settings that hamper flight maneuverability, especially during landing.

In other instances, conventional ice detectors are simply not accurate enough to be relied upon. For example, on the ground prior to take off, the presence of ice on the wings of aircraft is typically detected by visual inspection rather than ice detectors because of the particular importance of avoiding excessive ice buildup that may cause an aborted takeoff or crash. Moreover, visual inspection is necessary because conventional ice detectors cannot detect ice sublimation after application of regulation de-ice/anti-ice fluids (or anti-ice fluids that) that may flow until the engines are started. However, even visual inspection may be unreliable particularly when visibility is impaired by fog, falling snow, freezing rain and/or by darkness. Moreover, because of delays, it is often not possible to de-ice the aircraft shortly before takeoff, but conventional ice detectors are unable to determine whether de-icing is necessary.

Finally, as design considerations for modern certification requirements result in less ice tolerance, modern aircraft will need to have more anti-ice capability than some conventional anti-icing technologies can provide.

SUMMARY

To overcome the limitations described above, the present disclosure describes an ice detector comprising one or more LIDAR devices on an aircraft, wherein each of the LIDAR devices includes a transmitter and a receiver, each of the transmitters repetitively scan an aerodynamic surface on the aircraft using laser pulses, forming scattered laser pulses scattered from the aerodynamic surface, and each of the receivers receive the scattered laser pulses and output data comprising timing of the scattered laser pulses received in the receiver. Temporal changes in coordinates of the aerodynamic surface that indicate accumulation and/or shedding of ice on the aerodynamic surface are calculated from the output data.

Examples of the aerodynamic surface include, but are not limited to, the surface of a wing, the empennage, rotor, or engine nacelle on the aircraft.

Examples of housing for the LIDAR devices include, but are not limited to, in a wing fairing on the aircraft, in a bubble on the fuselage, or inside the fuselage behind an optical window.

The LIDAR devices are typically coupled to a computer that processes the output data.

In one embodiment, the computer calculates temporal changes in a thickness of the wing, the empennage, or the rotor from the temporal changes in the coordinates. The computer then uses the temporal changes in the thickness to determine accumulation or shedding of the ice.

In another embodiment, the data comprises a data set outputted for each of the plurality of scans representing the coordinates at different times, and for each of the data sets, the computer: filters the data set to remove bad returns corresponding to obscurants; extracts a shape of the aerodynamic surface from the data set using a shape model; determines one or more deformations in the shape due to flexing of the aerodynamic surface due to weight of the wing and/or pressure of airflow over the wing; and transforms the data set into common coordinates in a common reference frame using a transformation function. In this instance, the common reference frame comprises the aerodynamic surface without the deformations, and the transformation function transforms the aerodynamic surface having the deformations into the aerodynamic surface without the deformations. Then, temporal changes in the common coordinates in the common reference frame are used to detect the presence of the absence or the ice.

In yet a further embodiment, the receiver further comprises a spectrum analyzer and/or polarization detector outputting information comprising an optical property of the scattered laser pulses used to indicate a presence or absence of the ice on the aerodynamic surface. Examples of the optical property include, but are not limited to, polarization, intensity, chirp, frequency, and absorption of the laser pulses.

The scanning can comprise temporal and/or spatial scanning of the aerodynamic surface. In one example, the transmitters each scan the aerodynamic surface of a wing in one or more line patterns across cross sections of the wing; and the computer uses one or more scanning speeds of the scan to measure distances between the cross sections.

In yet another embodiment, one LIDAR device is positioned to scan the aerodynamic surface comprising an upper surface of the wing and output the data used to determine the coordinates of the upper surface, and another of the LIDAR devices is positioned to scan to the aerodynamic surface comprising a lower surface of the wing and output the data used to determine coordinates of the lower surface.

In a further embodiment, a first LIDAR device scans the aerodynamic surface comprising an upper surface of the wing, wherein the timing outputted from the first LIDAR device is used to determine the coordinates of the upper surface in a first direction; a second LIDAR device scans the upper surface of the wing, wherein the timing outputted from the second LIDAR device is used to determine the coordinates of the upper surface in a second direction; a third LIDAR device scans the aerodynamic surface comprising a lower surface of the wing, wherein the timing outputted from the third LIDAR device is used to determine the coordinates of the lower surface in the first direction; and a fourth LIDAR device scans the lower surface of the wing, wherein the timing outputted from the fourth LIDAR device is used to determine the coordinates of the lower surface in the second direction.

In one embodiment, each LIDAR device is mounted on a vibration dampening mount with mirrors to direct the laser pulses at the wing and allow the LIDAR device to adjust for in flight and ground wing flex. In another embodiment, each LIDAR device has a sixty degree field of view, a range of one hundred meters, scans at least fifty lines per second, and is located in the wing fairing behind a flush clear panel adjacent to wing lights.

The LIDAR detector is typically coupled to avionics and/or an ice protection system. In one embodiment, the LIDAR detector alerts the avionics/ice protection system when ice accumulates or is shed from the aerodynamic surface. In another embodiment, the LIDAR monitors functioning of ice protection systems and informs the avionics when ice protection systems are failing. In yet another embodiment, the LIDAR detector provides backup to current in-flight ice detection probes.

Thus, various LIDAR embodiments enable significant benefits over conventional art.

In one example, any avionics which are controlled by a primary ice detection system revert back to ice free settings once the detector indicates the aerodynamic surface is ice free, which improves airplane maneuver capability and overall aircraft safety.

In another example, the LIDAR detection system senses along the entire critical area of the aerodynamic surface as opposed to a single flush mounted surface sensor which can only measure at one spot.

In yet another example, the LIDAR detection system enables the aircraft to fly more efficiently, because the LIDAR only detects ice accretions that are present as opposed to conditions conducive to icing (which necessarily require more much more conservative flight protocols).

In yet a further example, after detecting the presence of ice, the LIDAR detects when the ice has left the aerodynamic surface (e.g., by shedding or sublimation), determining when there is no remaining ice and allowing ice protection systems to be turned off, leading to even more significant improvements in airplane efficiency (reducing fuel burn and emissions as compared to aircraft without ice detectors or with less accurate ice detectors).

In a further example, the LIDAR system characterizes the ice accretion being measured, so that the thickness, type, and location of the ice are capable of being known. This information can be used to reduce natural icing certification testing time, determine whether the icing is Supercooled Large Droplets (SLD), and provide long term icing prediction tool methodology improvements which can more efficient aircraft designs.

BRIEF DESCRIPTION OF THE DRAWINGS

Referring now to the drawings in which like reference numbers represent corresponding parts throughout:

FIG. 4A-4B illustrate a diagrammatic representation of transforming a deformed shape into a common reference frame, according to one or more embodiments.

FIGS. 7A and 7B are schematics illustrating incident angles used in one or more embodiments.

FIGS. 8A, 8B, and 8C are schematics illustrating measuring ice thickness according to one or more embodiments.

FIG. 11D is cross sectional data slice.

DETAILED DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

LIDAR (e.g., including Laser Detection and Ranging or LADAR) are is an optical sensing technology that measures properties of scattered light to detect distance, speed, rotation, and/or chemical composition information about a remote target or target area.

The present disclosure describes an aircraft comprising one or more LIDAR detectors having actual ice accretion detection capability when icing is encountered. Current TAT-style moisture sensor in-flight wing ice detectors, on the other hand, can only infer that icing conditions exist around the aircraft because they are unable to detect if ice has actually formed on a surface. After exiting icing conditions, the LIDAR detectors are also capable of detecting natural ice shedding and/or sublimation. This confirmation of the absence of ice allows the stall protection to be reset to normal levels. Conventional surface mounted icing condition detectors, on the other hand, cannot determine when ice has been sublimated or shed (an impracticably/impossibly large number of TAT detectors would have to be used for detecting ice accretion and sublimation).

LIDAR Apparatus

Figure 1:
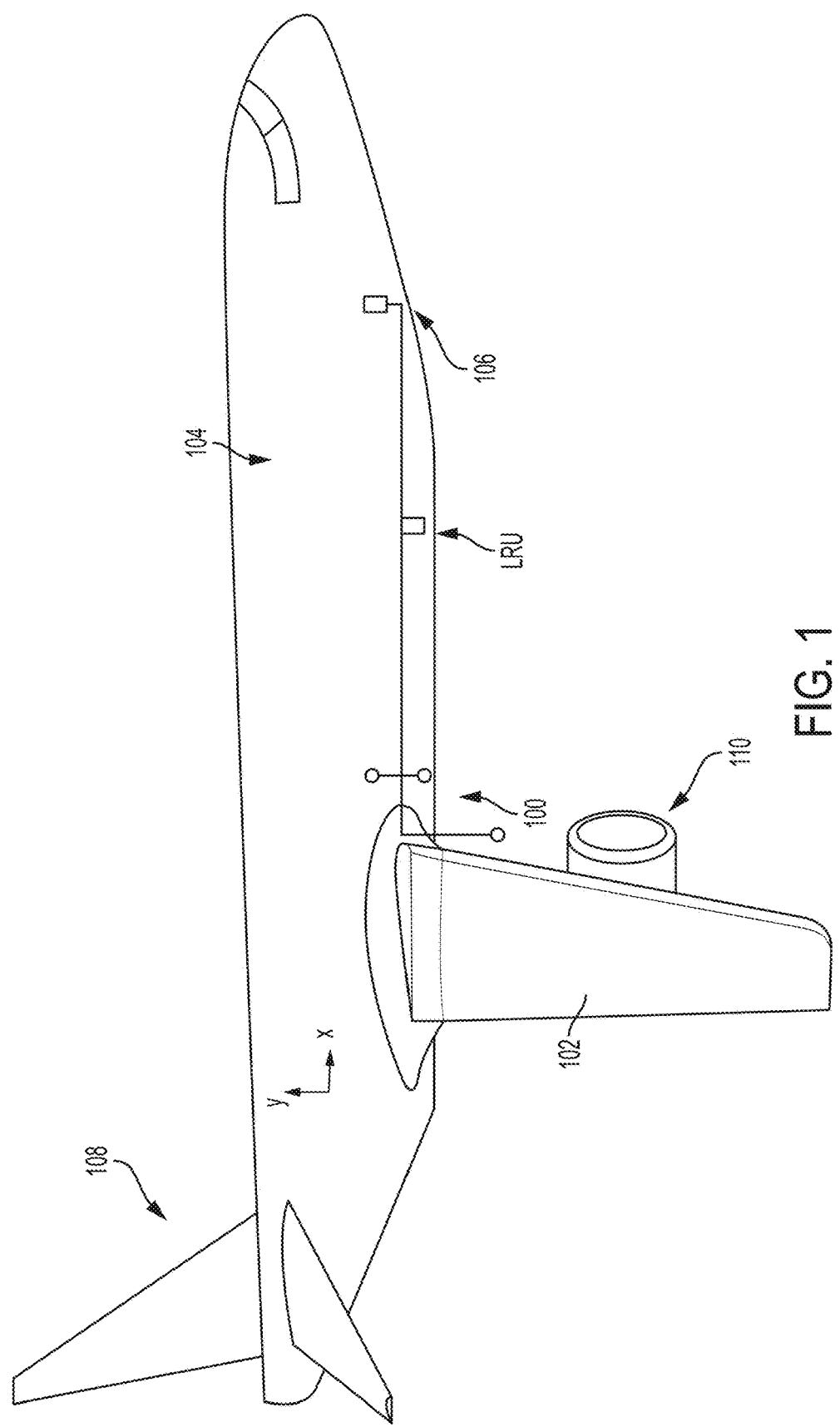
FIG. 1 is a diagrammatic representation of a conventional ice detector.
Figure 2:
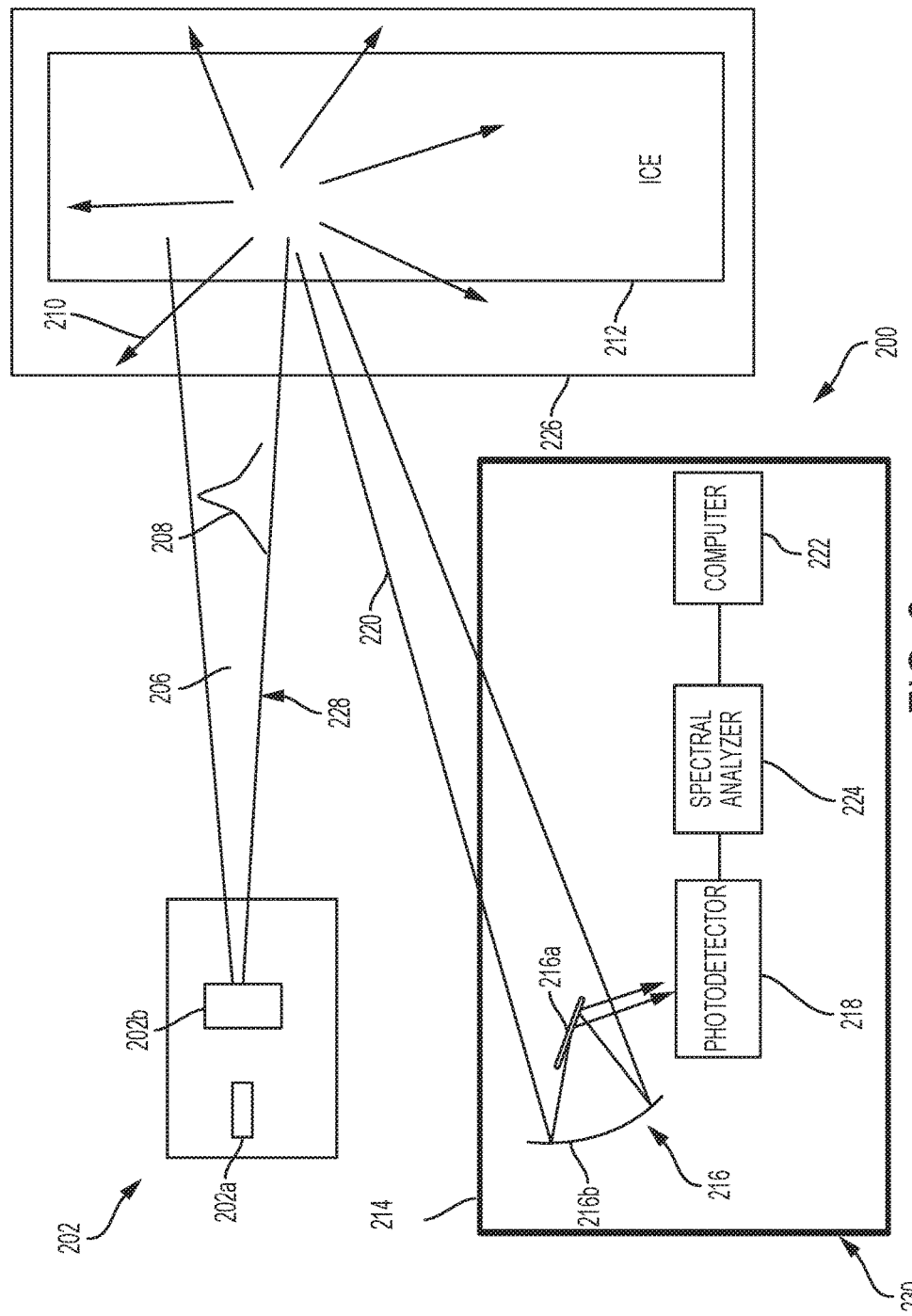
FIG. 2 is a diagrammatic representation of a LIDAR device used in one or more embodiments.

FIG. 2 illustrates the operating principle of a LIDAR sensor 200 detecting ice 212 on an aerodynamic surface 226 of an aircraft 104, according to an embodiment of the present invention. The LIDAR sensor comprises a transmitter 202 comprising a laser 202a (e.g., having an eyesafe 1.5 micron wavelength and 1 Watt output power) and emission optics 202b that transmit a stream or beam 206 of laser light pulses 208 to the aerodynamic surface 226. The light pulses 206 are reflected or scattered 210 by ice 212 on the aerodynamic surface. The LIDAR sensor 200 further comprises a receiver 214 comprising reception optics 216 (including mirrors 216a and 216b) and photodetector 218, wherein the reception optics 216 is positioned to receive the light pulses 220 reflected 210 or scattered by the ice 212 on the aerodynamic surface and focus the reflected light 220 onto the photodetector 218.

In one embodiment, the emission optics 202b comprises a scanning mechanism or means for steering the laser beam 206 onto the aerodynamic surface. In one example, scanning mechanism comprises a prism, to achieve a spherical scan pattern of the beam 206 on the aerodynamic surface. In another embodiment, the emission optics 202b comprises a mirror mounted on a mount, achieving a rectangular scan pattern of the beam 206 on the aerodynamic surface. In yet another embodiment, the scanning mechanisms comprises a non-mechanical laser beam steering and zooming mechanism.

FIG. 2 further illustrates the LIDAR sensor 200 comprises, or is connected to, a processor 222 performing numerical analysis. The processor 222 times the reflected signals/light pulses 220 and/or outputs three dimensional (3D) point cloud data used to measure the aerodynamic surface's coordinates.

Figure 9A:
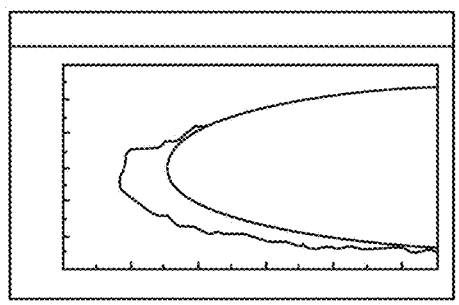
FIGS. 9A-9F are illustrations showing measurement of ice shapes.
Figure 9B:
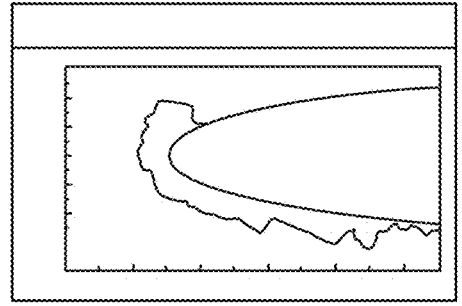
Figure 9C:
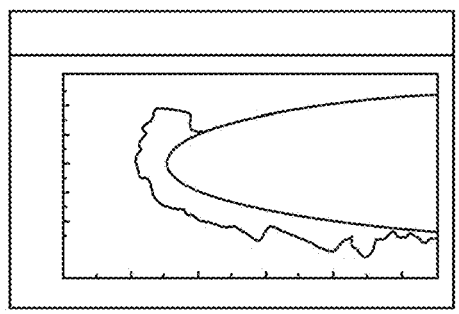
Figure 9D:
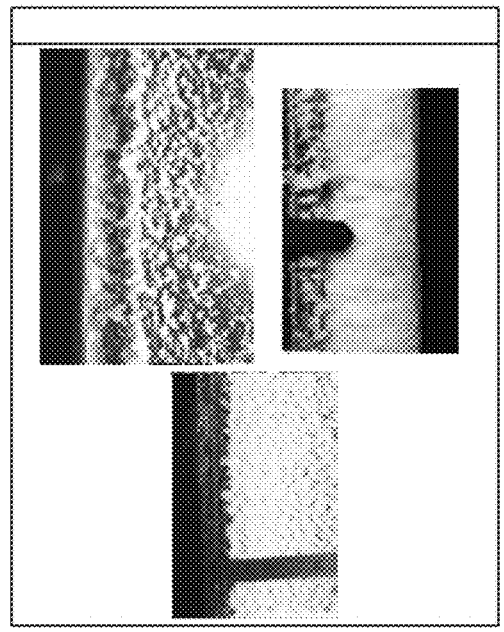
Figure 9E:
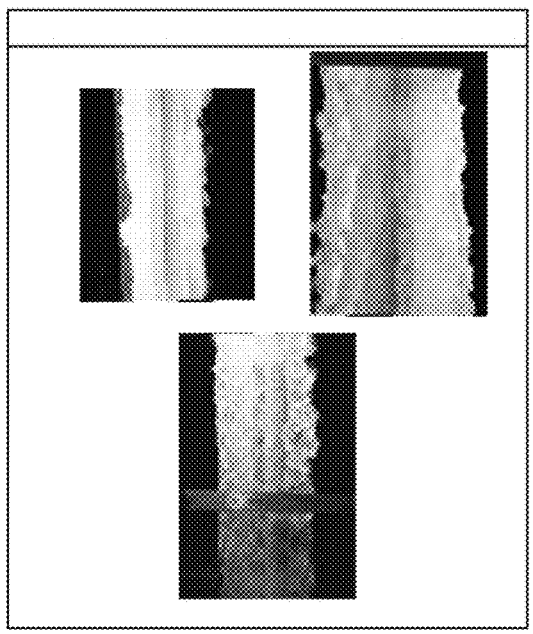
Figure 9F:
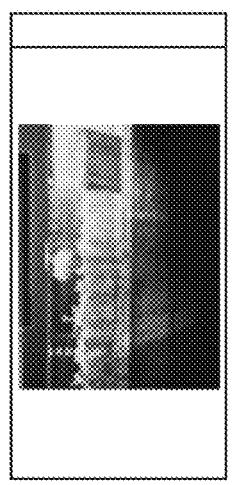

Thus, in one or more examples, a detector 230 comprises one or more of the LIDAR devices 200 positioned on an aircraft 104, each of the LIDAR devices 200 including a transmitter 202 and a receiver 214, wherein each of the transmitters 202 repetitively scan 228 the aerodynamic surface 226 (e.g., wing 102, empennage 108, or rotor 1002) on the aircraft 104, 1004 using laser pulses 208, forming scattered laser pulses 220 scattered from the aerodynamic surface 226. Each of the receivers 214 receive the scattered laser pulses 220 and output data comprising timing of the scattered laser pulses 220 received in the receiver 214. Temporal changes in coordinates of the aerodynamic surface 226, indicating a presence or absence of ice 212 on the aerodynamic surface 226, are calculated from the output data. In various examples, the computer 222 calculates temporal changes in a thickness of the wing 104, the empennage 108, or the rotor 1002 from the temporal changes in the coordinates. The computer uses the temporal changes in the thickness (T, see FIG. 9D) to determine accumulation of the ice 212 or shedding of the ice 212.

Ice Detection Processing

In one or more embodiments, the processing takes into account flexibility of the aerodynamic surface (e.g., commercial airplane wings are very flexible and the wing on the Boeing 787 is likely one of the most flexible). The flexing of the wing changes from the 1 G load on the ground without fuel to the 1 G load on the ground with fuel, to the 1 G air loaded wing with greatly varying weight and speed and flap configuration.

Figure 3:
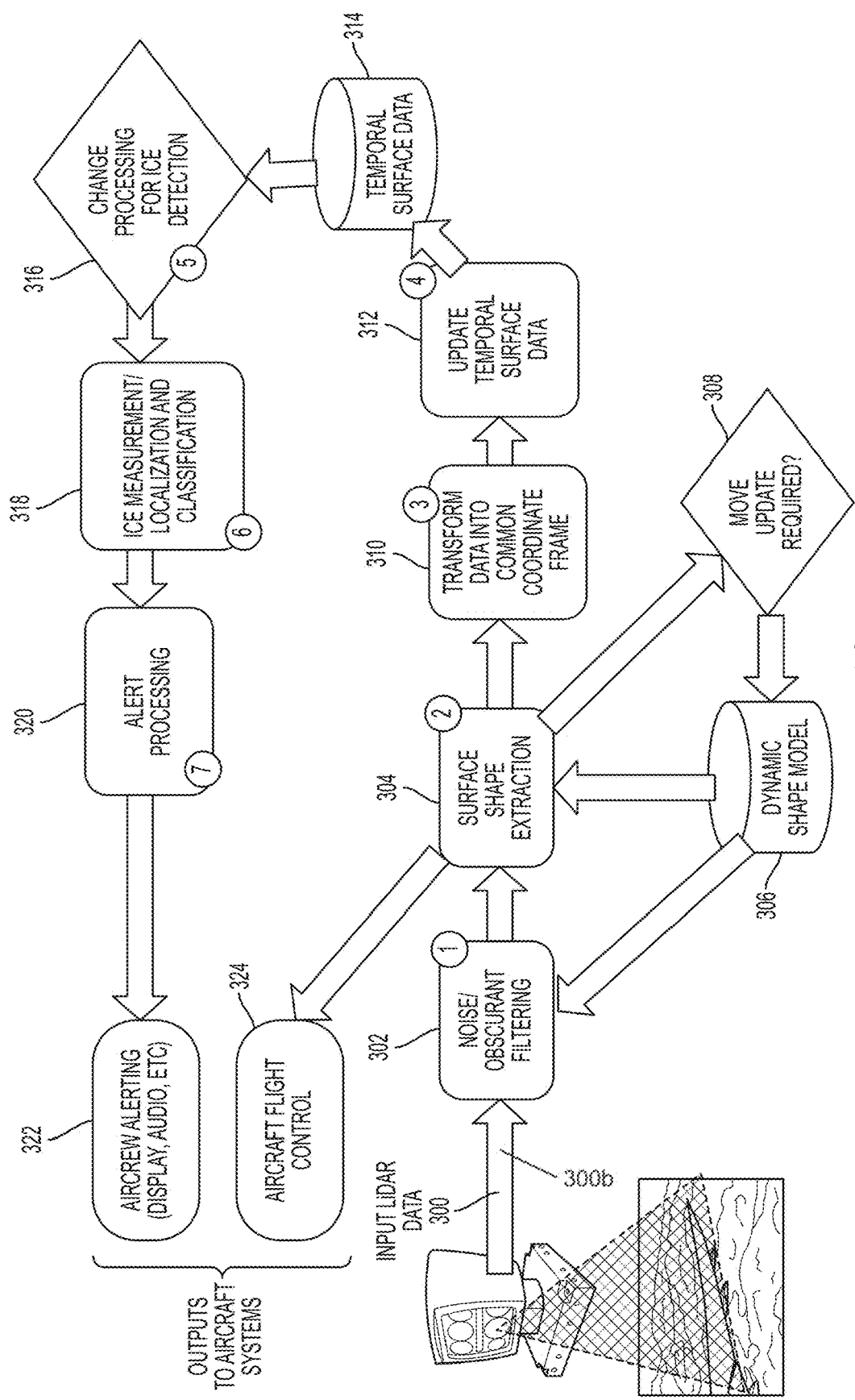
FIG. 3 is a flowchart illustrating ice detection processing operations according to one or more embodiments.

FIG. 3 is a flowchart illustrating a method of processing LIDAR data (e.g., as obtained using the apparatus of FIG. 2) to measure ice on a flexible aerodynamic surface (e.g., of a wing).

Block 300 represents inputting, to the processor 222, the 3D point cloud data representing the aerodynamic surface and generated by the LIDAR apparatus mounted on the aircraft. The 3D point cloud data should have sufficient range accuracy, time alignment, and registration to measure ice accumulation. In one embodiment, each data point includes additional data. Examples of additional data include, but are not limited to, polarization or intensity of the LIDAR return beam.

Block 302 represents pre-processing comprising filtering/removing bad returns due to obscurants (or other particles between the sensor and the aerodynamic surface) from the raw 3D point cloud data. Filtering examples include, but are not limited to, temporal/spatial filtering and waveform return filtering. In temporal/spatial filtering, a priori knowledge of where the aerodynamic surface should be (obtained from previous scans) is used to remove any outlying LIDAR return data that could not possibly originate from the aerodynamic surface. In waveform return filtering, filtering techniques at the individual LIDAR return level are used to determine which returns originate from a scattered/obscurant and which returns are "real" return originating from the aerodynamic surface. In one embodiment, the pulse shape of the return LIDAR beam is analyzed to identify the bad returns [1]. In another embodiment, faint intensity returns are associated with obscurants, whereas higher intensity returns are associated with ice.

Block 304 represents input pre-processing to extract the shape of the aerodynamic surface. Each time a full 3D point cloud is formed from the LIDAR data scan of the aerodynamic surface, the pre-processing simplifies these collected points into a shape model 306 for the aerodynamic surface. Examples of methods that are used include, but are not limited to, simple edge extraction and more complex model based methods [2] that extract the aerodynamic surface shape from the 3D point cloud data. Thus, the pre-processing can determine one or more deformations in the shape due to flexing of the aerodynamic surface.

Block 308 represents providing updates to the model to define current surface shape and reference data into a common coordinate frame.

Block 310 represents transformation of the current data into common surface data construct/frame using a transformation function. Once the shape has been extracted it is necessary to transform the data into a reference to that it can be compared over time periods where the shape is constantly changing (e.g., due to the vibrations or flexing). In one embodiment, the transformation uses witness points that are clearly identifiable (e.g. wing tips or control surfaces) to refine the shape distortion measurement. FIG. 4A illustrates a reference frame showing the deformed shape due to flexing, FIG. 4B illustrates a common reference frame comprising the aerodynamic surface without the deformations due to flexing, and the arrow 400 illustrates the transformation function that transforms the aerodynamic surface having the deformations into the aerodynamic surface without the deformations.

In one embodiment, as the leading edge changes configurations and slats are deployed, the LIDAR system checks the coordinates against a set of slat datasets.

Block 312 represents providing updates to a temporal database 314 of surface measurements. Once the filtered 3D point cloud data has been transformed into new coordinates in a common frame, the new coordinates are stored in the temporal database. While processing in previous steps comprised processing the shape of the aerodynamic surface, the processing in this step analyzes a more robust set of data that includes return intensity, polarization, etc. The end result is a set of data from which the last N number (corresponding to N different time measurements) of collocated surface points are compared. Consequently, the accumulation or the shedding of ice on the aerodynamic surface can be detected by analyzing the temporal changes in the coordinates in the common reference frame.

Block 316 represents changing detection to cue ice accumulation or shedding. This process looks at the current and N previous data from the aerodynamic surface to detect ice. Examples of the detection process include detecting buildup or deformation, a shift in the intensity returned from a portion of the wing, or a shift in the polarization indicating a different type of material. Examples of methods that are used range from, but are not limited to, a simple threshold change detection to a full blown machine learning construct that is trained on sample data.

In one embodiment, the LIDAR comprises a spectrum analyzer 224 and the guided pulses 208 are sampled over a range of frequencies to the spectral analyzer in order to yield a rich source of data on surface contaminants. In one embodiment, the surface is checked real time against a curvature or other database (e.g., standard spectral reflectivity or bidirectional reflectance distribution function table) and a contaminant map is created. By understanding the different surface coordinate changes of the aerodynamic surface, the system is made either sensitive or insensitive to certain contaminant types. As an example, certain coordinate change patterns are related to ice but not water.

Alternatively, the LIDAR ice detector can also serve as a detector which can differentiate between regular icing and SLD icing conditions (based on location and character of the ice).

Block 318 represents ice measurement, localization and classification. This is a process to measure the thickness, localize/segment the area, and classify the type of ice formed. Possible methods utilized include classification (e.g., neural nets, support vector machines (SVMs), k-nearest neighbor algorithms (KNN), and Bayesian methods) and localization (growing nearest neighbor search, multi-resolution subsampling).

Block 320 represents alert processing/generation. In one embodiment, once the ice is localized, classified, and the thickness is measured, higher level knowledge of icing on the aerodynamic surface is used to decide if and how to alert the crew 322 or other aircraft system 324 (e.g., ice on certain areas might be less critical, certain types of ice might be a greater concern, etc.). In one embodiment, the data forms a real time graphic for pilots on the ground, in visual conditions and in low visibility conditions.

Currently flight control systems do not adjust for in-flight wing flexing directly. The flight controls react in response to aircraft level detection systems and must use additional force to compensate for the inertia that is built up in the portions of a second that today's systems can react in. In one embodiment, wing location data received from the LIDAR system is communicated directly to flight control systems to allow the aircraft to react more quickly to in flight conditions.

Ice Detector Positioning Embodiments

Figure 5A:
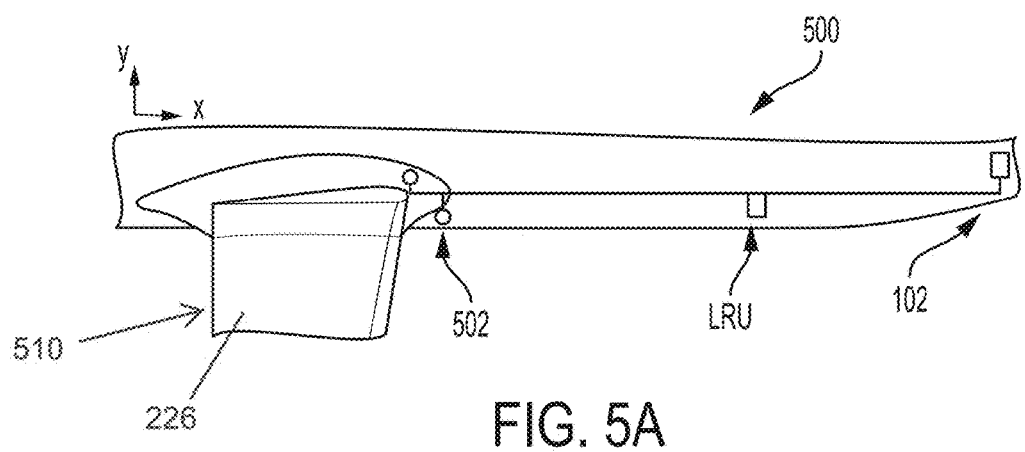
FIG. 5A is a schematic side view showing of positioning of LIDAR devices according to one or more embodiments.
Figure 5B:
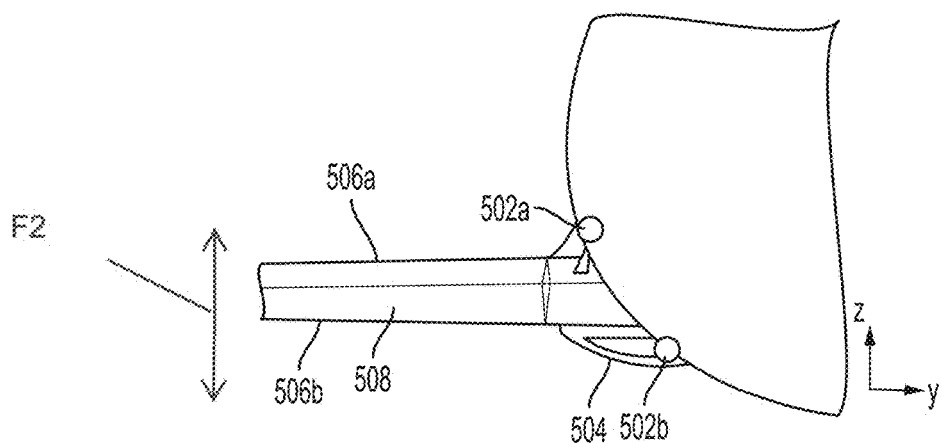
FIG. 5B is a schematic cross-section showing positioning of LIDAR devices according to one or more embodiments.

FIGS. 5A and 5B illustrate an ice detector embodiment for use on an aircraft 500, comprising a plurality of LIDAR devices 502a, 502b each including a transmitter 202 and a receiver 214, wherein the LIDAR devices are disposed in an aircraft fairing 504. In each LIDAR device 200, the transmitter 202 transmits laser pulses 208 to the aerodynamic surface(s) 506a, 506b on the aircraft's wing 508 and the receiver 214 receives the laser pulses 220 reflected/scattered off of the wing 508. One of the LIDAR devices 502a transmits/receives laser pulses 208, 220 to/from the upper surface 506a of the wing and one of the LIDAR devices 502b transmits/receives laser pulses 208, 220 to/from the lower surface 506b of the wing 508.

In one embodiment, the transmitters 202 comprise laser 202a and emission optics 202b and the receivers 214 comprise reception optics 216 and photodetector 218 as illustrated in FIG. 2. and the aerodynamic surface's coordinates are determined based on timing of the laser pulses reflected off the aerodynamic surface (e.g., using the processing illustrated in FIG. 3).

FIG. 5A shows the icing data is fed into a LRU to be compared against a database, wherein the database informs the aircraft in-flight computers with icing levels. In one embodiment, the LIDAR implementation reduces wiring, bonding requirements, and the number of sensors needed per wing, as compared to conventional probe (TAT) based detectors.

Figure 6:
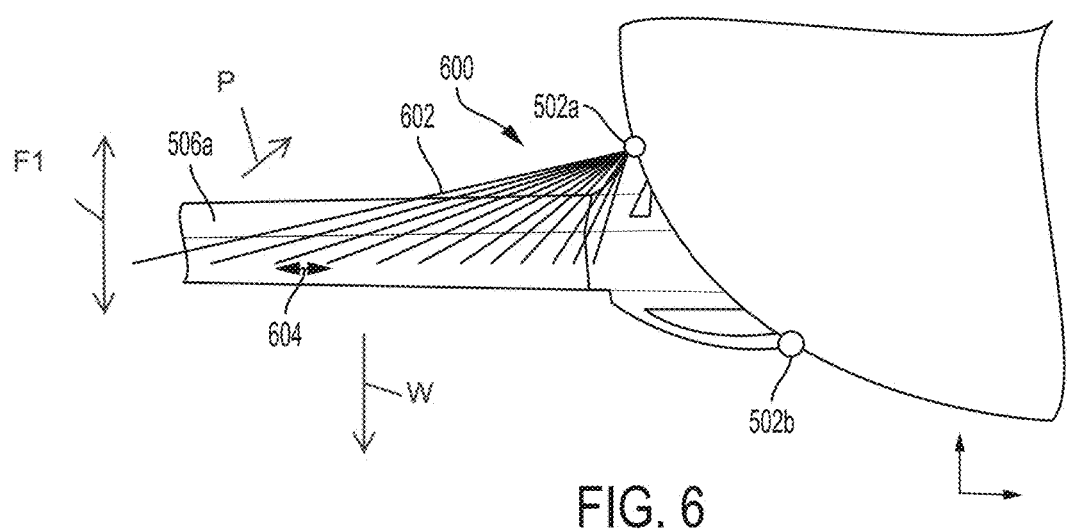
FIG. 6 is a schematic cross-section showing light pulses swept in line patterns to measure cross-sections of the aerodynamic surface according to one or more embodiments.

LIDAR devices are not limited to positioning behind an aircraft fairing, as illustrated in FIGS. 5A, 5B, and 6. Further examples of LIDAR positioning include, but are not limited to, inside the aircraft fuselage or in a bubble on the aircraft fuselage (e.g., near the nose of the aircraft). Such examples enable flight hardened all weather ice detection and increased reliability, and assured operations in austere environments such as the arctic.

FIG. 6 illustrates an embodiment wherein the transmitter 202 scans the aerodynamic surface 506a of the wing 508 in one or more line patterns 600 across cross-sections 602 of the wing 508 so that the light pulses 208 swept/scanned in the line patterns 600 measure the cross-sections 602 of the aerodynamic surface 506a, 506b of the wing 508. The scan speed determines the distance 604 between the cross-sections 602, and the distance determines the line-density of the cross-sections 602 on the aerodynamic surface 506a. Thus, the computer 222 uses one or more of the scanning speeds of the scan 228 to measure distances 604 between the cross-sections 602. In one embodiment, changes in the line density are used to measure flexing of the wing. By monitoring the coordinate change of the aerodynamic surface 506a over time, the scanning adapts to the wing flex and still builds an accurate image of aerodynamic surface 506a.

FIGS. 5-6 further illustrate the positioning of multiple LIDAR devices 200. In one example, a first LIDAR device 502a is positioned to scan 228 the aerodynamic surface 224 comprising an upper surface 506a of the wing 508 by transmitting the laser pulses 208 to the upper surface 506a, wherein the timing/data 300 outputted from the first LIDAR device 502a is used to determine the coordinates of the upper surface 506a; and a second LIDAR device 502b is positioned to scan the aerodynamic surface 224 comprising a lower surface 506b of the wing 508 by transmitting the laser pulses 208 to the lower surface 506b, wherein the timing/data 300 outputted from the second LIDAR device 502b is used to determine the coordinates of the lower surface 506b. In another example, a first LIDAR device 200 is positioned to transmit the laser pulses 208 to the upper surface 506a of the wing 508, wherein the timing outputted from the first LIDAR device 200 is used to determine the coordinates of the upper surface 506a in a first direction x; a second LIDAR device 200 is positioned to transmit the laser pulses 208 to the upper surface 506a of the wing, wherein the timing outputted from the second LIDAR device 200 is used to determine the coordinates of the upper surface 506a in a second direction y; a third LIDAR device 200 is positioned to transmit the laser pulses 208 to the lower surface 506b of the wing 508, wherein the timing outputted from the third LIDAR device 200 is used to determine the coordinates of the lower surface 506b in the first direction x; and a fourth LIDAR device 200 is positioned to transmit the laser pulses 208 to the lower surface 506b of the wing 508, wherein the timing outputted from the fourth LIDAR device 200 is used to determine the coordinates of the lower surface 506b in the second direction y.

FIG. 7 illustrates embodiments wherein each of the LIDAR units 502a transmits the laser pulses 208 making a 3-30 degree angle of incidence on the wing in relation to the y axis in the x-y plane and a 5-70 degree angle of incidence on the wing in reference to the y axis in the z-y plane. In one embodiment, the LIDAR devices comprise gimballed stereo wide angle LIDAR units in order to achieve a range of angles of incidence. This allows in-flight data to be collected within 100 meters and 30-80 degree incidence angles.

Ice Thickness Detection

FIG. 8 illustrates a LIDAR system measuring ice thickness on a wing, wherein the LIDAR system measures a location of a clean wing surface and a location of a dirty ice surface. The difference is the thickness of the ice. In one embodiment, the LIDAR device is placed at close proximity to the ice on the aircraft, transmits the laser pulse at high incidence angle onto the aerodynamic surface, and records data with low vibration to generate a clean boundary level with little effects of compressibility. For example, the LIDAR system can model the clean or dirty target surface with 0.5-1 mm level resolution.

Ice Shape Detection

Cardboard traces and photography from aircraft windows are two of the current methods for collecting data on icing shapes. However, these methods generate data on icing shapes with relatively low resolution, as illustrated in FIG. 9. In one embodiment, the LIDAR system generates much higher resolution information on icing shapes. In another embodiment, the LIDAR detects SLD ice shapes, thereby differentiating between regular aircraft icing and SLD icing based on the ice shape location and character.

Rotor Aircraft

Figure 10A:
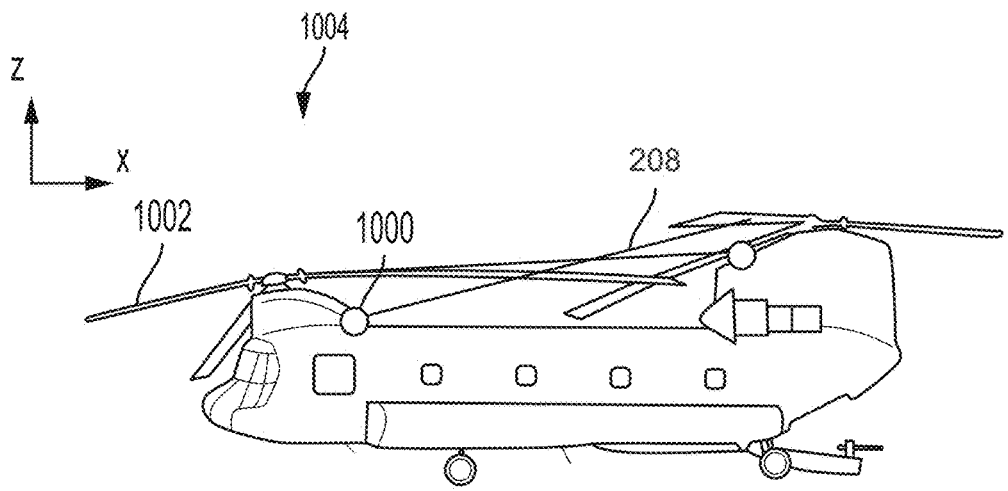
FIGS. 10A-10B are diagrammatic representations showing the positioning of LIDAR devices on a helicopter according to one or more embodiments.
Figure 10B:
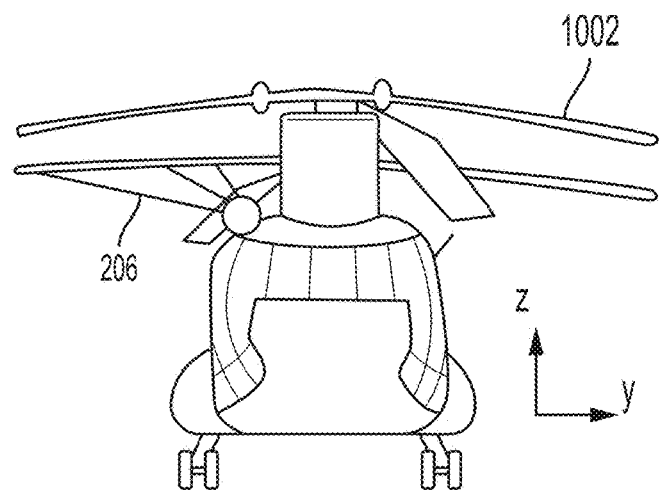

FIGS. 10A and 10B illustrate positioning of LIDAR devices 1000 in a flight ice detection system for rotors 1002 on a rotorcraft 1004. The LIDAR devices transmit laser pulses 208 at both the front and rear rotor blades and detect ice accumulation and shapes on the front and lower surface of the rotors. In one or more embodiments, icing data is obtained with 0.5-1 mm level resolution.

Experimental Results

Figure 11A:
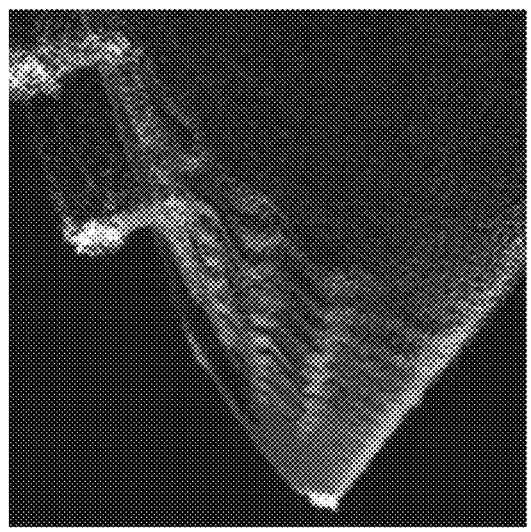
FIGS. 11A-11D are images showing the actual LIDAR data collected from an airfoil with ice on its surface.
Figure 11B:
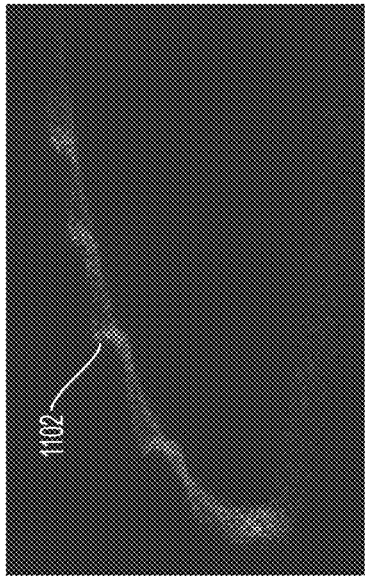
Figure 11C:
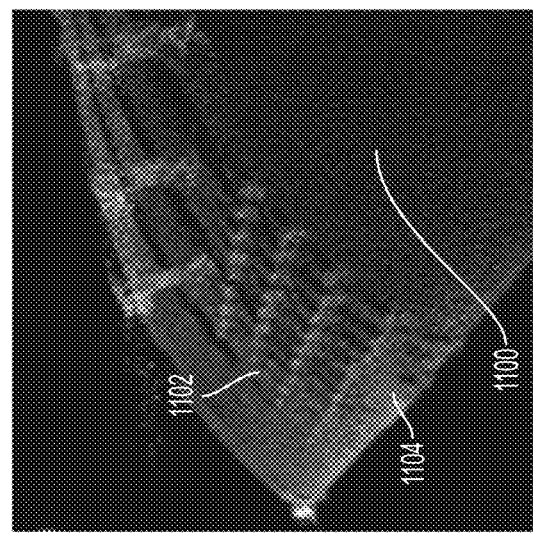
Figure 11D:
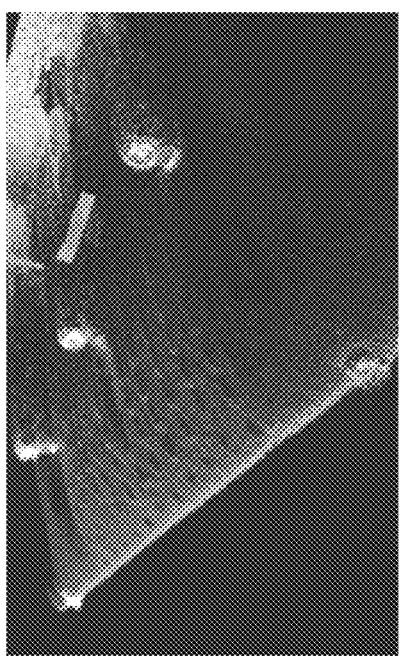

FIG. 11A-11D illustrates the results from one ground demonstrator validating the LIDAR technology for ice detection. These images show the actual LIDAR data collected from an airfoil 1100 having ice 1102 on its surface, using LIDAR beam having a 85 degree angle of incidence on the airfoil 1100. The cross section data slice in FIG. 11D shows that the LIDAR detected the ice blocks 1102 having a height of 1 mm. Moreover, FIG. 11A-11D also illustrate detection of ice shedding (i.e., absence of detected ice) as a result of activation of an anti-ice system on regions 1104 of the airfoil 1100. In practice, ice sublimation on unheated regions of the airfoil (e.g., slats) also results from increased airspeed during flight or changing altitude during flight.

Process Steps

Figure 12:
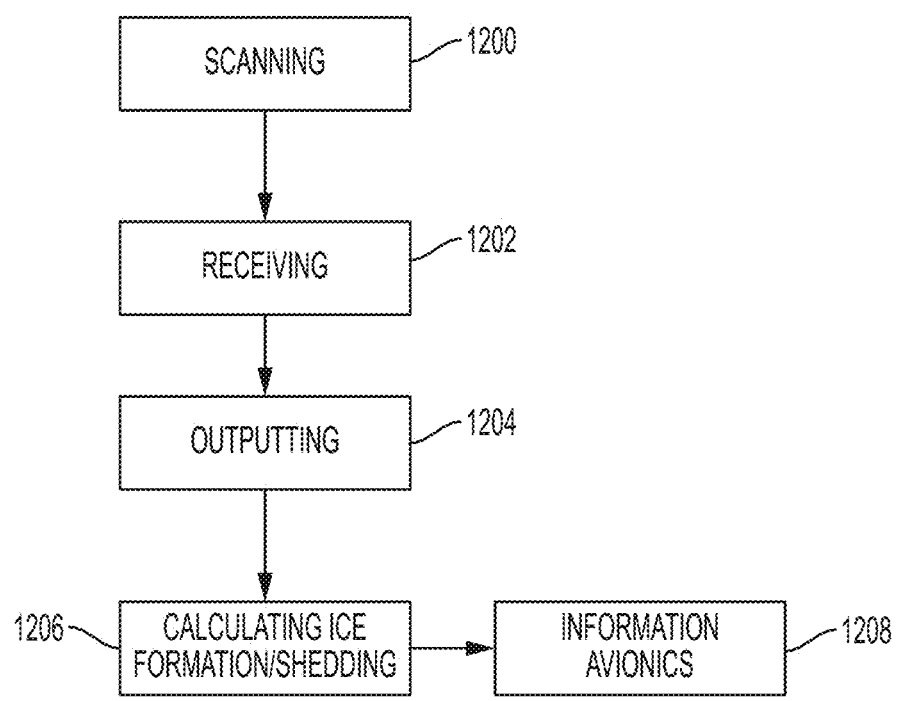
FIG. 12 is a flowchart illustrating a method of detecting ice, according to one or more embodiments.

FIG. 12 is a flowchart illustrating a method of measuring an aerodynamic surface of an aircraft, in flight, on the ground, or in a wind tunnel using one or more LIDAR devices each comprising a transmitter and a receiver.

Examples of aircraft include, but are not limited to, airplanes, commercial aircraft, military aircraft, rotorcraft, UAVs, and nitrogen recovery systems and cryogenic fuel tanks such as those used on launch vehicles.

Examples of aerodynamic surfaces include, but are not limited to, a canard, a wing, a leading edge of a wing, empennage, and engine inlet, and a rotor or propeller.

Block 1200 represents repetitively scanning one or more aerodynamic surfaces on the aircraft using laser pulses transmitted from one or more of the transmitters, forming scattered laser pulses scattered from the aerodynamic surface.

In one embodiment, the laser pulses 208 scan/sweep the aerodynamic surface 224 with a scanning speed (e.g., at least 2000 points per minute) that is faster than timescales on which vibrations or flexing of the aerodynamic surface take place (in other words, a bandwidth of the scanning is greater than a bandwidth of the motion of the aerodynamic surface). In one example, the LIDAR transmitter 202 and receiver 214 are mounted on a mounting system with active damping. In another example, the LIDAR transmitter and receiver are mounted on a vibration dampened two axis mount with mirrors that direct the laser pulses to the wing, wherein the LIDAR devices each have at least a 60 degree field of view and scan at least fifty lines per second.

Block 1202 receiving the scattered laser pulses in one or more of the receivers. In one or more examples, the receiver 214 further comprises a spectrum analyzer 224a and/or polarization detector 224b outputting information on an optical property of the laser pulses 208 associated with a presence or absence of the ice 212. Examples of the optical property include, but are not limited to, polarization, intensity, chirp, frequency, and absorption of the laser pulses 220.

Block 1204 represents outputting data (e.g., 3D point cloud data) from the receivers, wherein the data 300 comprises timing of the scattered laser pulses received in the receivers (e.g., time of flight of a laser pulse 208 between the transmitter and receiver via the aerodynamic surface) or other data used to calculate the coordinates c of the aerodynamic surface 226. In one or more examples, the data 300 comprises a data set 300b outputted for each of plurality of scans 228 representing the aerodynamic surface's coordinates c at different times.

Block 1206 represents using the timing data/3D point cloud data to calculate/determine temporal changes in coordinates c of the aerodynamic surface that indicate accumulation of ice on the aerodynamic surfaces and/or shedding of the ice from the aerodynamic surfaces.

In one embodiment, the LIDAR data is processed to obtain a LIDAR output as illustrated in FIG. 3. In one or more embodiments, for each of the data sets 300, the computer 1300 extracts 304 a shape 510 of the aerodynamic surface 226 from the data set 300 using a shape model 306; determines 306 one or more deformations F2 in the shape 510 due to flexing F1 of the aerodynamic surface 226 (e.g., due to weight W of the wing 508 and/or pressure P of airflow over the wing 508); and transforms 310, 400 the data set 300b into coordinates c' in a common reference frame 402 using a transformation function 404. The common reference frame 402 comprises the aerodynamic surface 226 without the deformations F2, and the transformation function 404 transforms 400 the aerodynamic surface 226 having the deformations F2 into the aerodynamic surface 226 without the deformations F2. Temporal changes in the common coordinates c' in the common reference frame 402 are used to detect the presence or absence of the ice 212.

In one or more examples, prior to extracting the shape, the computer 1300 filters 302 the data to remove data corresponding to obscurants.

In another embodiment, data from an accelerometer is used to identify contributions to the data corresponding to vibrations/flexing of the aerodynamic surface, wherein the contributions are retracted/extracted from the data to obtain the LIDAR output.

In yet another embodiment, timescales of the variations in the LIDAR data are used to identify data corresponding to vibrations/flexing of the aerodynamic surface. For example, variations over longer time scales (e.g., a threshold over several minutes) are associated with ice buildup, whereas variations over shorter time scales are associated with aerodynamic surface vibrations/flexing.

In a further embodiment, angular variations in the aerodynamic surface measured by the LIDAR are associated with wing flexing (e.g., wing flexing can be in a range of 5-10 degrees or correspond to a deflection at the wing tip of over 5 degrees).

In yet a further embodiment, a processor compares the measured co-ordinates of the aerodynamic surface in real time with a curvature database representing flexing and/or twisting of the aerodynamic surface under non-icing conditions, and generates a map indicating presence and/or absence of ice on the wing by identifying the changes that are not related to flexing of the aerodynamic surfaces.

In yet a further embodiment, changes in intensity of the scattered laser pulses (reflectivity of the aerodynamic surface), frequency chirping of the LIDAR scattered laser pulses (Doppler effects), or changes in polarization of the LIDAR laser pulses are used to differentiate ice formation from obscurants and artefacts due to motion of the aerodynamic surface. In one example, the laser pulses comprise a range of wavelengths, the receiver detects absorption of the laser pulses as a function of the wavelength, and the processor compares the absorption with a database comprising absorption of known contaminants, so that the contaminants on the aerodynamic surface are identified.

The LIDAR output is capable of being collected and processed in real time. Examples of the output include, but are not limited to, digital data, a graphical representation, a 2D or 3D image, or a video (e.g., of ice flow), having high or low resolution. Examples of LIDAR output include, but are not limited to, the following capabilities.

In flight ice detection on an aerodynamic surface such as a wing or rotor blade identified in various environments, including, but not limited to, through a cloud of water vapor, dust, or other airborne particulates, and various flexing conditions. In one or more examples, the LIDAR processing may be capable of detecting the accumulation of a 1 mm layer of ice on an airfoil surface of a fixed wing that is moving at between 0 and 60 Hz and/or located between 1 and 20 meters from the LIDAR transmitter and/or that angled at an angle of incidence between 5 and 90 degrees. In other examples, the LIDAR may detect the accumulation or sublimation of a 1 mm layer of ice at any location on the airfoil surface through a cloud full of various amounts and sizes of rain and water, as well as through boundary layer compression, and anywhere in the flight envelope. In further examples, the LIDAR detects the accumulation of a 1 mm layer of ice on an airfoil surface of a rotor that is motiving at between 500 to 4500 Hz.

In flight ice shape detection and/or ice characterization on the aerodynamic surface such as a wing or rotor, including increased knowledge of the ice shapes formed on the wing or the rotor blades as compared to measurements achieved by conventional methods. In one or more embodiments, the LIDAR output differentiates different materials or types of ice/water. For example, the LIDAR output can differentiate SLD, rain, water, freezing rain, and drizzle.

In flight/ground airfoil determination and motion tracking, including in flight or ground rotor tracking and balancing. In one embodiment, this is performed more rapidly that is currently achieved.

Block 1208 represents using the data/outputting icing data to avionics, as discussed below.

Activation/De-Activation of Aircraft Systems

In one embodiment, an aircraft system is activated or de-activated in accordance with the LIDAR output. For example, when the aircraft system is an aircraft protective system (avionics or de-icing system), the protective system is activated on the aerodynamic surface in response to the LIDAR sensor detecting ice on the aerodynamic surface, and then later de-activated once the LIDAR sensor indicates the ice has sublimated/shed below a desired level. In one example, the LIDAR output meets certification requirements for ice accretion or conditions detection.

In another embodiment, the LIDAR output is used for in flight health monitoring, including monitoring functioning of the anti-ice systems. In yet another embodiment, the LIDAR output reduces the frequency that the wing ice protection system turns on when not in icing, thereby reducing the fuel burn and associated maintenance.

In another example, the superior accuracy of the LIDAR output is used to exploit the full capabilities of modern ice protection systems (e.g., as found on the Boeing 787) to an extent that is not possible using conventional ice detectors. For example, the LIDAR output is capable of detecting pre-activation ice (ice that accretes prior to Wing Ice Protection System (WIPS) activation) sufficiently fast and with a tight enough thickness threshold to be able to address certification requirements for maneuver and stall warning margins (see, e.g., 14 CFR Part 25 for certification requirements). This functionality would also be particularly useful for use in conjunction with the WIPS and Primary Ice Detection System found on a Boeing 787 aircraft so as to activate WIPS during takeoff roll.

Updating Flight Parameters

In a further embodiment, the LIDAR output is used to change the flight trajectory or flight speed (e.g., fly around to avoid ice or revert to more normal flight trajectory/speed after ice shedding). In this way, the LIDAR system removes conservatism in the stall warning and related systems, allowing for maximum maneuver capability by not penalizing the airplane when it is not necessary, and while still meet threshold required by certification rules. Conventionally, once icing conditions have been encountered, most airplanes with stall warning systems (containing the flight parameters for use during stall) set the stall warning tables to the iced table settings (containing the flight parameters for use during icing conditions) for the remainder of the flight (even after exiting the icing conditions) because the ice detector cannot confirm the ice has been shed. These icing setting require higher aircraft speeds that are not optimal for landing manoeuvers. However, an aircraft system according to one embodiment of the present invention includes a flight control system including stall warning tables that are set to icing settings when ice is detected by the LIDAR system, but then revert to normal once the LIDAR system indicates ice on the aerodynamic surface has sublimated/shed below a desired level. This enables the flight control system to engage lower speeds for landing when the LIDAR system indicates ice has been shed after the ice encounter.

Thus, the LIDAR system's superior ability (including increased reaction times and accuracy) to detect the accumulation of ice on the critical aerodynamic surfaces of the aircraft (as well as when such ice is shed and/or sublimated) is a major benefit, because it enables the ice protection systems to be used less frequently and activated more efficiently, increased operational capabilities in icing conditions (i.e., increased flight envelopes), and operation of air control systems that increase flight efficiency (including reduced drag and increased fuel efficiency). These benefits also increase safety of flight in icing conditions or during near ground operations.

Rotorcraft Applications

In yet another embodiment, the LIDAR output is used to detect ice and ice shedding on a rotorcraft. Examples of rotorcraft include, but are not limited to, Chinook and Apache helicopters. For example, the LIDAR output can be used to expand the icing flight envelope from temperatures of −5 degrees Celsius and above to temperatures as low as at least −10 C. In another example, the LIDAR output is used in conjunction with a helicopter having de-ice/anti-ice capability (e.g., an Apache having a new composite main rotor blade designed to include a de-icing blanket as well as a tail rotor including erosion/de-ice capability enhancements).

While in some embodiments the LIDAR detector replaces conventional ice conditions detectors, in other embodiments, the LIDAR output is integrated with data from other sensor systems and used to augment the output from the other sensor systems.

Database Creation

In a further embodiment, the LIDAR data is used to create reference tables which are used to, e.g., help differentiate the ice from other materials (such as coatings) and differentiate between different types of ice. Examples of tables include, but are not limited to standard spectral reflectivity tables, bidirectional reflectance distribution function (BRDF tables) or tables that map/interpret various measured features to the LIDAR data as a function of angle, intensity, and polarization of the LIDAR return beam, and diffusion and opacity of the detected ice or target. Using the reference tables, LIDAR ice sensing can be achieved through different materials, weather, water, foliage, and other challenges to conventional sensing approaches.

Wind Tunnel Applications

In a further embodiment, the LIDAR sensor is used as an instrument in a wind tunnel and the LIDAR output comprises ice accretion data in the wind tunnel.

Tool Enhancement and Certification

In another embodiment, the LIDAR output is used for tool enhancement and the design of more robust and less conservative ice protection systems and/or more efficient aircraft and simpler avionics. Specifically, using the LIDAR characterized 3D ice shapes obtained from actual flight conditions (which currently cannot be done) will allow development of novel tools and ice protection systems. More high quality tools will result in less icing tunnel testing and less flight testing, thereby reducing cost for development, testing and certification. Moreover, the LIDAR system can be used to model the clean target surface of a wing as it responds to specific flight conditions and air loads (this data can be verified with strain gage data from aeroelastic tests to verify wing location vibration and amplitude). In one embodiment, a 5-10 mm level resolution of the 3D point cloud data is used.

In yet another embodiment, the LIDAR output is used to develop capabilities needed to address new icing rules for which little is known about the ice shapes. Thus, the LIDAR output can provide data that certification agencies, icing professionals, and/or aircraft component manufacturers need to improve product efficiencies, product safety, comply with certification/regulatory standards, or develop alternative certification strategies. This is particularly useful because aircraft operators are looking to increase their operational capabilities in icing conditions, while commercial aviation regulatory bodies worldwide are planning to require all aircraft to increase their ability to detect and react to ice formation on critical surfaces.

Hardware Environment

Figure 13:
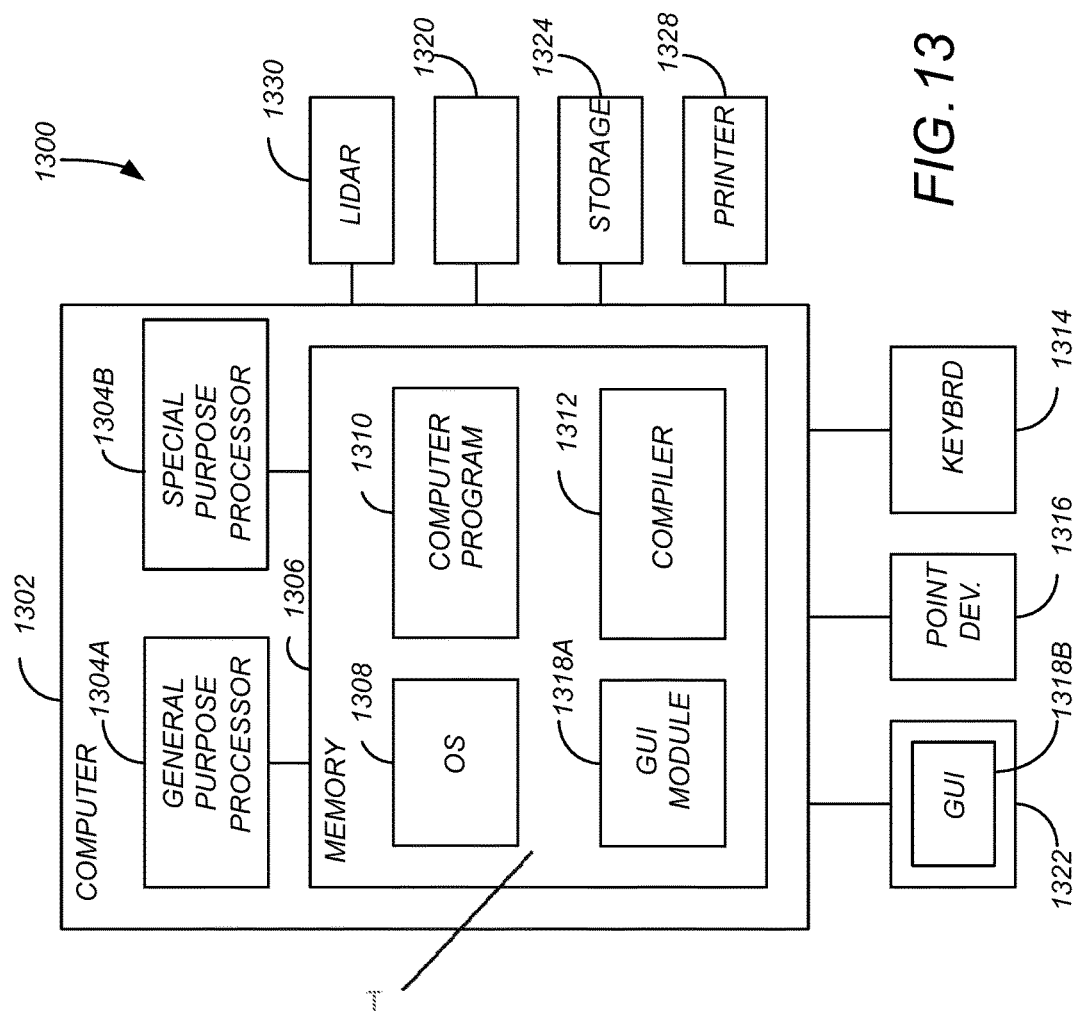
FIG. 13 illustrates a hardware for implementing various software and processing requirements of the LIDAR sensor.

FIG. 13 illustrates an exemplary computer or system 1300 that could be used to implement processing elements of the above disclosure (e.g., as described in FIG. 3), including in the LRU or avionics. While FIG. 13 illustrates the LIDAR devices 1330 coupled to the computer system 1300, LIDAR devices can also comprise the computer system 1300. The computer 1302 comprises a processor 1304 and a memory, such as random access memory (RAM) 1306. In embodiments requiring a human interface, the computer 1302 is operatively coupled to a display 1322, which presents images such as windows to the user on a graphical user interface 1318B. The computer 1302 may be coupled to other devices, such as a keyboard 1314, a mouse device 1316, a printer, etc. Of course, those skilled in the art will recognize that any combination of the above components, or any number of different components, peripherals, and other devices, may be used with the computer 1302.

In one or more embodiments, the computer system 1300 comprises avionics, wherein the avionics 1300 revert stall warning tables T to normal, allowing the aircraft 500 to fly under non-icing conditions after the detector 200 alerts the ice 212 has been shed from the aerodynamic surface 226.

Generally, the computer 1302 operates under control of an operating system 1308 stored in the memory 1306, and interfaces with the user to accept inputs and commands and to present results through a graphical user interface (GUI) module 1318A. Although the GUI module 1318B is depicted as a separate module, the instructions performing the GUI functions can be resident or distributed in the operating system 1308, the computer program 1310, or implemented with special purpose memory and processors. The computer 1302 also implements a compiler 1312 which allows an application program 1310 written in a programming language such as Java, C++, C#, or other language to be translated into processor 1304 readable code. After completion, the application 1310 accesses and manipulates data stored in the memory 1306 of the computer 1302 using the relationships and logic that was generated using the compiler 1312. Analogous results can be accomplished with field programmable gate arrays (FPGAs). The computer 1302 also optionally comprises an external communication device such as a modem, satellite link, Ethernet card, or other device for communicating with other computers.

In one embodiment, instructions implementing the operating system 1308, the computer program 1310, and the compiler 1312 are tangibly embodied in a computer-readable medium, e.g., data storage device 1320, which could include one or more fixed or removable data storage devices, such as a zip drive, floppy disc drive 1324, hard drive, CD-ROM drive, tape drive, etc. Further, the operating system 1308 and the computer program 1310 are comprised of instructions which, when read and executed by the computer 1302, causes the computer 1302 to perform the operations herein described. Computer program 1310 and/or operating instructions may also be tangibly embodied in memory 1306 and/or LIDAR devices 1330, thereby making a computer program product or article of manufacture. As such, the terms "article of manufacture," "program storage device" and "computer program product" as used herein are intended to encompass a computer program accessible from any computer readable device or media.

It is understood that the foregoing embodiment of the computer system includes peripherals (e.g. display 1322, GUI module 1318A, GUI 1318, mouse device 1316, keyboard 1314, printer 1328 or compiler 1312) that may be useful in the ground station 118 and similar applications, but unnecessary not included in the other processing elements.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

REFERENCES

[1] US. Patent Publication No. 2011/0313722
[2] Feature curve extraction from point clouds via developable strip intersection, Journal of Computational Design and Engineering, Vol. 3, Issue 2, pages 102-111, April 2016.

What is claimed is:

1. A detector, comprising:
one or more Light Detection and Ranging (LIDAR) devices on an aircraft, each of the LIDAR devices including a transmitter and a receiver, wherein:
each of the one or more transmitters repetitively scan an aerodynamic surface on the aircraft using laser pulses, forming scattered laser pulses scattered from the aerodynamic surface, and
each of the one or more receivers receive the scattered laser pulses and output data comprising timing of the scattered laser pulses received in the one or more receivers; and
a computer coupled to the one or more LIDAR devices, the computer calculating temporal changes in coordinates of the aerodynamic surface from the output data, the temporal changes indicating a presence or absence of ice on the aerodynamic surface; wherein:
the temporal changes are adjusted to exclude changes resulting from flexing of the aerodynamic surface due to changes in pressure of airflow over the aerodynamic surface or
the laser pulses scan the aerodynamic surface with a scanning speed that is faster than timescales on which the flexing takes place.

2. The detector of claim 1, wherein:
the aerodynamic surface is the surface of a wing, an empennage, or rotor on the aircraft,
the LIDAR devices are coupled to the computer,
the computer calculates temporal changes in a thickness of the wing, the empennage, or the rotor from the temporal changes in the coordinates, and
the computer uses the temporal changes in the thickness to determine accumulation of the ice or shedding of the ice.

3. The detector of claim 1, wherein:
the one or more transmitters scan the aerodynamic surface of a wing in one or more line patterns across cross sections of the wing;

the computer uses one or more scanning speeds of the scan to measure distances between the cross sections, and changes in the line density of the one or more line patterns are used to measure the flexing of the wing.

4. The detector of claim 1, comprising two of the LIDAR devices, wherein:

one of the LIDAR devices is positioned to scan the aerodynamic surface comprising an upper surface of a wing and output the output data used to determine the coordinates of the upper surface, and another of the LIDAR devices is positioned to scan the aerodynamic surface comprising a lower surface of the wing and output the output data used to determine coordinates of the lower surface.

5. The detector of claim 1, wherein the one or more LIDAR devices are housed in a wing fairing on the aircraft.

6. The detector of claim 1, wherein:

the output data comprises a data set outputted for each of the plurality of scans representing the coordinates at different times, and for each of the data sets, the computer:
extracts a shape of the aerodynamic surface from the data set using a shape model;
determines one or more deformations in the shape due to the flexing of the aerodynamic surface due to weight of the aerodynamic surface comprising a wing and/or the pressure of the airflow over the wing;
transforms the data set into common coordinates in a common reference frame using a transformation function, wherein:
the common reference frame comprises the aerodynamic surface without the deformations, and
the transformation function transforms the aerodynamic surface having the deformations into the aerodynamic surface without the deformations; and
the temporal changes in the common coordinates in the common reference frame that exclude changes resulting from the flexing of the aerodynamic surface are used to detect the presence or the absence of the ice.

7. The detector of claim 6, wherein the computer filters the data to remove data corresponding to obscurants.

8. The detector of claim 1, wherein the one or more receivers further comprise a spectrum analyzer and/or polarization detector outputting information on an optical property of the laser pulses associated with the presence or the absence of the ice.

9. The detector of claim 8, wherein the optical property is at least one property selected from polarization, intensity, chirp, frequency, and absorption of the laser pulses.

10. The detector of claim 1, wherein the LIDAR devices detect shedding of the ice from the aerodynamic surface.

11. The detector of claim 1 coupled to avionics, wherein:
the avionics reverts stall warning tables to normal, allowing the aircraft to fly under non-icing conditions after the detector alerts the ice has been shed from the aerodynamic surface.

12. A method for detecting accumulation or shedding of ice from one or more aerodynamic surfaces on an aircraft, comprising:
providing one or more Light Detection and Ranging (LIDAR) devices on an aircraft, each of the LIDAR devices including a transmitter and a receiver;
repetitively scanning one or more aerodynamic surfaces on the aircraft using laser pulses transmitted from one or more of the transmitters, forming scattered laser pulses scattered from the one or more aerodynamic surfaces;
receiving the scattered laser pulses in one or more of the receivers;
outputting data from the one or more receivers comprising timing of the scattered laser pulses received in the one or more receivers; and
calculating, from the data, temporal changes in coordinates of the one or more aerodynamic surfaces, the temporal changes indicating accumulation of ice on the one or more aerodynamic surfaces and/or shedding of the ice from the one or more aerodynamic surfaces, wherein:
the temporal changes are adjusted to exclude changes resulting from flexing of the one or more aerodynamic surfaces due to changes in pressure of airflow over the one or more aerodynamic surfaces or
the laser pulses scan the one or more aerodynamic surfaces with a scanning speed that is faster than timescales on which the flexing takes place.

13. The method of claim 12, wherein the one or more aerodynamic surfaces include a surface of a wing, an empennage, or rotor on the aircraft, the method further comprising:
calculating the temporal changes in a thickness of the wing, the empennage, or the rotor from the temporal changes in the coordinates; and
using the temporal changes in the thickness to determine the accumulation or the shedding of the ice.

14. The method of claim 12, further comprising:
scanning the one or more aerodynamic surfaces of a wing in one or more line patterns across cross sections of the wing and using one or more scanning speeds; and
using the one or more scanning speeds to measure distances between the cross sections, wherein changes in the line density of the one or more line patterns are used to measure the flexing of the wing.

15. The method of claim 12, wherein the LIDAR devices include a first LIDAR device and a second LIDAR device, the method further comprising:
positioning the first LIDAR device transmitting the laser pulses to the aerodynamic surface comprising an upper surface of a wing, wherein the timing outputted from the first LIDAR device is used to determine the coordinates of the upper surface; and
positioning the second LIDAR device transmitting the laser pulses to the aerodynamic surface comprising a lower surface of the wing, wherein the timing outputted from the second LIDAR device is used to determine the coordinates of the lower surface.

16. The method of claim 12, wherein the LIDAR devices comprise a first LIDAR device, a second LIDAR device, a third LIDAR device, and a fourth LIDAR device, the method further comprising:
positioning the first LIDAR device transmitting the laser pulses to the aerodynamic surface comprising an upper surface of the wing, wherein the timing outputted from the first LIDAR device is used to determine the coordinates of the upper surface in a first direction;
positioning the second LIDAR device transmitting the laser pulses to the upper surface of the wing, wherein the timing outputted from the second LIDAR device is used to determine the coordinates of the upper surface in a second direction;

positioning the third LIDAR device transmitting the laser pulses to the aerodynamic surface comprising a lower surface of the wing, wherein the timing outputted from the third LIDAR device is used to determine the coordinates of the lower surface in the first direction; and positioning the fourth LIDAR device transmitting the laser pulses to the lower surface of the wing, wherein the timing outputted from the fourth LIDAR device is used to determine the coordinates of the lower surface in the second direction.

17. The method of claim 12, further comprising:

receiving the data comprising a data set outputted for each of the plurality of scans and representing the coordinates of one of the aerodynamic surfaces at different times, for each of the data sets:
  extracting a shape of the one or more aerodynamic surfaces from the data set using a shape model;
  determining one or more deformations in the shape due to the flexing of the one or more aerodynamic surfaces;
  transforming the data set into coordinates in a common reference frame using a transformation function, wherein:
    the common reference frame comprises the one of the aerodynamic surfaces without the deformations, and
    the transformation function transforms the one of the aerodynamic surfaces having the deformations into the one of the aerodynamic surfaces without the deformations; and
  detecting the accumulation or the shedding of the ice on the one of the aerodynamic surfaces using the temporal changes in the coordinates in the common reference frame.

18. The method of claim 12, wherein the data further comprises information on an optical property of the laser pulses, the method further comprising using the optical property to detect the accumulation or the shedding of the ice.

19. The method of claim 12, further comprising alerting avionics when the detecting indicates the ice has been shed from the one or more aerodynamic surfaces so that the avionics reverts stall warning tables to normal and allows the aircraft to fly under non-icing conditions.

20. A detector, comprising:

one or more Light Detection and Ranging (LIDAR) devices on an aircraft, each of the LIDAR devices including a transmitter and a receiver, wherein:

each of the one or more transmitters repetitively scan an aerodynamic surface on the aircraft using laser pulses, forming scattered laser pulses scattered from the aerodynamic surface, each of the one or more receivers receive the scattered laser pulses and output data comprising timing of the scattered laser pulses received in the one or more receivers; and a computer coupled to the one or more LIDAR devices, the computer calculating temporal changes in coordinates of the aerodynamic surface from the output data, the temporal changes indicating a presence or absence of ice on the aerodynamic surface, wherein:

the LIDAR devices comprise a first LIDAR device, a second LIDAR device, a third LIDAR device, and a fourth LIDAR device, the first LIDAR device scans the aerodynamic surface comprising an upper surface of a wing, wherein the timing outputted from the first LIDAR device is used to determine the coordinates of the upper surface in a first direction, the second LIDAR device scans the upper surface of the wing, wherein the timing outputted from the second LIDAR device is used to determine the coordinates of the upper surface in a second direction, the third LIDAR device scans the aerodynamic surface comprising a lower surface of the wing, wherein the timing outputted from the third LIDAR device is used to determine the coordinates of the lower surface in the first direction, and the fourth LIDAR device scans the lower surface of the wing, wherein the timing outputted from the fourth LIDAR device is used to determine the coordinates of the lower surface in the second direction.

* * * * *